United States Patent
Verma et al.

(10) Patent No.: US 8,732,720 B2
(45) Date of Patent: May 20, 2014

(54) JOB SCHEDULING BASED ON MAP STAGE AND REDUCE STAGE DURATION

(75) Inventors: Abhishek Verma, Chapmaign, IL (US); Ludmila Cherkasova, Sunnyvale, CA (US); Vijay S. Kumar, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 181 days.

(21) Appl. No.: 13/335,847

(22) Filed: Dec. 22, 2011

(65) Prior Publication Data

US 2013/0167151 A1 Jun. 27, 2013

(51) Int. Cl.
*G06F 9/46* (2006.01)
*G06F 7/00* (2006.01)

(52) U.S. Cl.
USPC ............ 718/106; 718/102; 718/101; 707/705

(58) Field of Classification Search
USPC .......................................................... 718/102
See application file for complete search history.

(56) References Cited

U.S. PATENT DOCUMENTS

| | | |
|---|---|---|
| 7,756,919 B1 | 7/2010 | Dean et al. |
| 2010/0094828 A1* | 4/2010 | Mehta et al. ................. 707/705 |
| 2010/0281166 A1 | 11/2010 | Buyya et al. |

OTHER PUBLICATIONS

Chang et al., "Scheduling in MapReduce-Like Systems for Fast Completion Time," IEEE INFORGOM 2011, Apr. 10-15, 2011, 9 p.
Elteir et al., Enhancing MapReduce via Asynchronous Data Processing, Dec. 8-10, 2010, 9 p.
Phan et al., "Real-Time MapReduce Scheduling," Oct. 6, 2010, 6 p.
S. M. Johnson, "Optimal Two- and Three-Stage Production Schedules with Setup Times Included," Naval Research Logistics Quaterly, vol. 1, Issue 1, pp. 61-68, Mar. 1954.
Verma et al., "ARIA: Automatic Resource Inference and Allocation for MapReduce Environments," ICAC '11, Jun. 14-18, 2011, 10 p.

* cited by examiner

*Primary Examiner* — Meng An
*Assistant Examiner* — Bing Zhao (57) ABSTRACT

A plurality of job profiles is received. Each job profile describes a job to be executed, and each job includes map tasks and reduce tasks. An execution duration for a map stage including the map tasks and an execution duration for a reduce stage including the reduce tasks of each job is estimated. The jobs are scheduled for execution based on the estimated execution duration of the map stage and the estimated execution duration of the reduce stage of each job.

14 Claims, 4 Drawing Sheets

JOB SCHEDULING BASED ON MAP STAGE AND REDUCE STAGE DURATION

BACKGROUND

Many enterprises (such as companies, educational organizations, government agencies, etc.) acquire relatively large volumes of data for analysis. A substantial amount of the data of an enterprise can be unstructured data, i.e., data that is not in a format used by typical commercial databases. Enterprises may apply distributed computing techniques to mine information from the unstructured data.

BRIEF DESCRIPTION OF THE DRAWINGS

For a detailed description of examples of various embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The recitation "based on" is intended to mean "based at least in part on." Therefore, if X is based on Y, X may be based on Y and any number of additional factors.

DETAILED DESCRIPTION

The following discussion is directed to various examples of MapReduce scheduling. The examples disclosed should not be interpreted, or otherwise used, as limiting the scope of the disclosure, including the claims. In addition, one skilled in the art will understand that the following description has broad application, and the discussion of any example is not intended to intimate that the scope of the disclosure, including the claims, is limited to that example.

The MapReduce framework provides a distributed computing platform that can be employed to process relatively large volumes of unstructured data. Unstructured data refers to data not formatted according to a format of a relational database management system. HADOOP is an open-source implementation of the MapReduce framework. The MapReduce framework is being increasingly used by enterprises for distributed advanced data analytics and for information management associated with data retention, regulatory compliance, e-discovery, litigation, etc.

MapReduce jobs are distributed and executed across multiple compute nodes of a cluster machine. The MapReduce framework includes a master node that manages multiple worker nodes. Each worker node has a fixed number of map slots and reduce slots, which can run tasks. The number of map and reduce slots may be statically configured (typically, one or two per core or disk). The worker nodes may periodically send heartbeats to the master node to report the number of free slots and the progress of tasks that they are currently running. Based on the availability of free slots and the scheduling policy, the master node assigns map and reduce tasks to slots in the cluster.

Map tasks of a job combine to form a map stage and the reduce tasks of the job combine to form a reduce stage. Each map task processes a logical split of input data that generally resides on a distributed file system. The map task reads the data, applies a user-defined map function to each record, and buffers the resulting output. The map task output data is sorted and partitioned for different reduce tasks, and stored by the machine executing the map task. The reduce stage consists of three phases: shuffle, sort and reduce. In the shuffle phase, the reduce tasks fetch the intermediate data files from the already completed map tasks. In the sort phase, the intermediate files from all the map tasks are sorted. After the intermediate data is shuffled, the sorted files are merged. Thus, the shuffle and sort phases are interleaved. In the reduce phase, the sorted intermediate data is passed to the user-defined reduce function. The output from the reduce function may be written back to the distributed file system.

The map function processes corresponding segments of input data to produce intermediate results, where each of the multiple map tasks (that are based on the map function) process corresponding segments of the input data. For example, the map tasks process input key-value pairs to generate a set of intermediate key-value pairs. The reduce tasks (based on the reduce function) produce an output from the intermediate results. For example, the reduce tasks merge the intermediate values associated with the same intermediate key.

More specifically, the map function takes input key-value pairs ($k_1$, $v_1$) and produces a list of intermediate key-value pairs ($k_2$, $v_2$). The intermediate values associated with the same key $k_2$ are grouped together and then passed to the reduce function. The reduce function takes an intermediate key $k_2$ with a list of values and processes them to form a new list of values ($v_3$), as expressed below.

$$\text{map}(k_1, v_1) \rightarrow \text{list}(k_2, v_2)$$

$$\text{reduce}(k_2, \text{list}(v_2)) \rightarrow \text{list}(v_3)$$

Although reference is made to the MapReduce framework in some examples, it is noted that techniques or mechanisms according to some implementations can be applied in other distributed processing frameworks. More generally, map tasks are used to process input data to output intermediate results, based on a predefined function that defines the processing to be performed by the map tasks. Reduce tasks take as input partitions of the intermediate results to produce outputs, based on a predefined function that defines the processing to be performed by the reduce tasks. In addition, although reference is made to unstructured data in some examples, techniques or mechanisms according to some implementations can also be applied to structured data formatted for relational database management systems.

In batch workloads comprising a plurality of MapReduce jobs, there are no dependencies across jobs, and the jobs can be executed in any order. Conventional implementations of MapReduce may execute the jobs of a batch in a random order. The execution of jobs may be pipelined because each MapReduce job is executed using two different types of resources: map slots for map tasks and reduce slots for reduce tasks. Therefore, once one job finishes its map stage, a second job can immediately start its map stage such that it overlaps with the reduce stage of the previous job.

The scheduler disclosed herein schedules a set of concurrent MapReduce jobs to minimize or reduce the execution time of the jobs on a MapReduce cluster. The scheduler accurately estimates the completion time of the map and reduce stages of each MapReduce job as a function of application performance metrics and allocated resources, and generates an optimized job execution schedule based on the timing estimates. The scheduler may apply any of a variety of scheduling methodologies to the timing estimates to produce an execution schedule.

Figure 1:
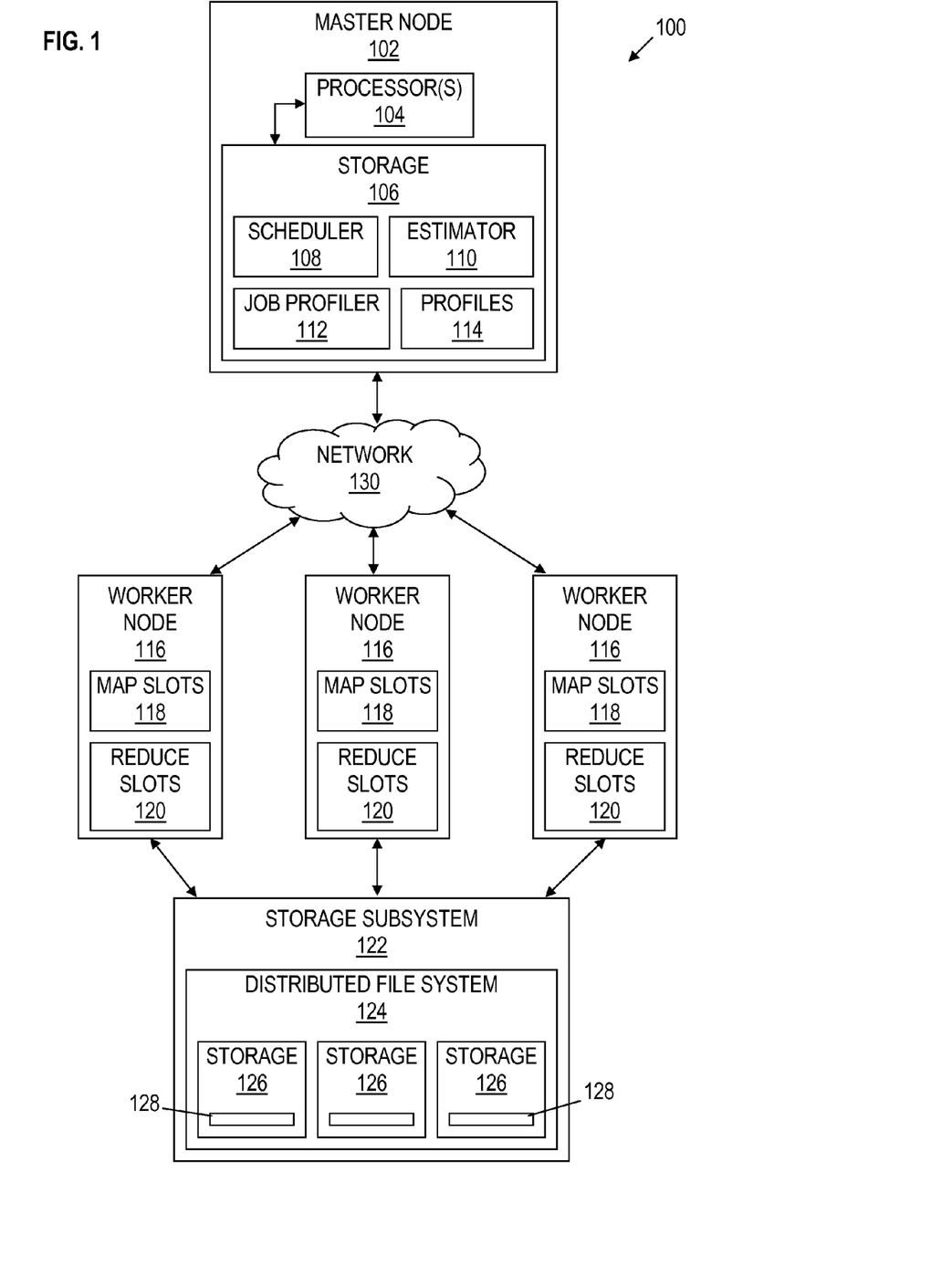
FIG. 1 shows a block diagram for a system for scheduling and executing jobs in accordance with principles disclosed herein.

FIG. 1 shows a block diagram for a system 100 for scheduling and executing jobs in accordance with principles disclosed herein. The system 100 includes a master node 102 coupled to a plurality of worker nodes 116 via a network 130. The worker nodes 116 are coupled to a storage subsystem 122. In some implementations, the worker nodes 116 may couple to the storage subsystem 112 through the network 130, a different network, direct connections, etc. The network 130 can be a private network (e.g., a local area network, a wide area network, etc.) or a public network (e.g., the Internet), or a combination thereof.

The storage subsystem 122 includes multiple storage modules 126, and the multiple storage modules 126 can implement a distributed file system 124. The distributed file system 124 stores multiple segments 128 of input data across the multiple storage modules 126. The distributed file system 124 can also store outputs of map and reduce tasks.

The storage modules 126 can be implemented with storage devices such as disk-based storage devices, integrated circuit storage devices, or other non-transitory storage devices. The storage modules 126 may correspond to respective different physical storage devices. Multiple storage modules 126 can be implemented on one physical storage device, where the multiple storage modules 126 correspond to different partitions of the storage device.

The master node 102 includes processor(s) 104. Each worker node 116 also includes a processor (not shown). The processor(s) 104 may include, for example, one or more general-purpose microprocessors, digital signal processors, microcontrollers, or other suitable devices known in the art. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

A "node" refers generally to processing infrastructure to perform computing operations. A node can refer to a computer, or a system having multiple computers. Alternatively, a node can refer to a processor within a computer. As yet another example, a node can refer to a processing core within a processor that has multiple processing cores.

The master node 102 is configured to perform scheduling of jobs on the worker nodes 116. Each worker node 116 has a fixed number of map slots 118 and reduce slots 120, where map tasks are run in respective map slots 118, and reduce tasks are run in respective reduce slots 120. The number of map slots 118 and reduce slots 120 within each worker node 116 can be preconfigured, such as by an administrator or by some other mechanism. The available map slots 118 and reduce slots 120 can be allocated to the jobs executed by the system 100. The map slots 118 and reduce slots 120 are considered the resources used for performing map and reduce tasks. A "slot" can refer to a time slot or alternatively, to some other share of a processing resource that can be used for performing the respective map or reduce task. Depending upon the loading of the system 100, the number of map slots 118 and the number of reduce slots 120 that can be allocated to any given job can vary.

The worker nodes 116 can periodically (or repeatedly) send messages to the master node 102 to report the number of free slots and the progress of the tasks that are currently running in the corresponding worker nodes 116. Based on the availability of free slots (map slots and reduce slots) and the rules of a scheduling policy, the master node 102 assigns map and reduce tasks to respective slots in the worker nodes 116.

Each map task processes a logical segment of the input data that generally resides on a distributed file system, such as the distributed file system 124. The map task applies the map function on each data segment and buffers the resulting intermediate data. The intermediate data is partitioned for input to the multiple reduce tasks.

The reduce stage (that includes the reduce tasks) has three phases: shuffle phase, sort phase, and reduce phase. In the shuffle phase, the reduce tasks fetch the intermediate data from the map tasks. In the sort phase, the intermediate data from the map tasks are sorted. An external merge sort may be used in cases where the intermediate data does not fit in memory. In the reduce phase, the sorted intermediate data (in the form of a key and all its corresponding values, for example) is passed to the reduce function. The output from the reduce function may be written back to the distributed file system 124.

Although the master node 102 is depicted as being separate from the worker nodes 116, in alternative examples, the master node 102 can be one of the worker nodes 116.

The master node 102 includes storage 106 for storing data and/or instructions accessible to the processor(s) 104. The storage 106 is a non-transitory computer-readable storage device and includes volatile storage such as random access memory, non-volatile storage (e.g., a hard drive, an optical storage device (e.g., CD or DVD), FLASH storage, read-only-memory), or combinations thereof. The storage 104 may also be separate and/or remote from the master node 102. The scheduler 108, estimator 110, and job profiler 112 may include instructions executable by the processor(s) 104 to perform the function described herein. Processors execute software instructions. Software instructions alone are incapable of performing a function. Therefore, any reference to a function performed by software instructions, or to software instructions performing a function is simply a shorthand means for stating that the function is performed by a processor executing the instructions.

The master node 102 includes a job profiler 112 that can create a job profile 114 for a given job to be executed by the system 100. The job profile 114 describes characteristics of the given job, and may be stored in the storage 106, e.g., as part of a job profile database formed in the storage 106 that stores any number of different job profiles for past, current, and/or future jobs.

The master node 102 also includes a performance characteristic estimator 110. The estimator 110 produces an estimated performance characteristic, such as an estimated map phase completion time and an estimated reduce phase completion time, of a job, based on the corresponding job profile and resources (e.g., numbers of map slots and reduce slots) allocated to the job. The estimated completion time refers to either a total time duration for a map or reduce phase, or an estimated time at which the map or reduce phase will complete. In some examples, other performance characteristics of a job can be estimated, such as total job duration or completion time, cost of the job, error rate of the job, etc.

The master node 102 includes a scheduler 108. The scheduler 108 generates a schedule for execution of multiple jobs (e.g., a batch) to be executed on the system 100. The scheduler 108 determines the sequence of job execution based on the estimated map phase and reduce phase completion times of each job produced by the estimator 110. The scheduler 108 arranges the jobs in a sequence that reduces the overall execution time of the group of jobs, and provides an optimal or near-optimal execution time for the batch. In some implementations of the system 100, the job profiler 112, estimator 110, schedule 108, and/or profiles 114 may be located in a node other than the master node 102.

The job profile 114, produced by the job profiler 112 or provided from another source, reflects all phases of a given job: map, shuffle, sort, and reduce phases. The job profile 114 data is used by the estimator 110 to predict the job completion time, and to estimate the completion times of map and reduce stages of the job.

The map stage includes a number of map tasks. To characterize the distribution of the map task durations and other invariant properties, the following metrics can be specified in some examples:

$(M_{min}, M_{avg}, M_{max}, \text{AvgSize}_M^{input}, \text{Selectivity}_M)$, where:
- $M_{min}$ is the minimum map task duration. As the shuffle phase starts when the first map task completes, $M_{min}$ is used as an estimate for the shuffle phase beginning.
- $M_{avg}$ is the average duration of map tasks to indicate the average duration of a map wave.
- $M_{max}$ is the maximum duration of a map task. As the sort phase of the reduce stage can start only when the entire map stage is complete, i.e., all the map tasks complete, $M_{max}$ is used as an estimate for a worst case map wave completion time.
- $\text{AvgSize}_M^{input}$ is the average amount of input data for a map stage. This parameter is used to estimate the number of map tasks to be spawned for new data set processing.
- $\text{Selectivity}_M$ is the ratio of the map data output size to the map data input size, and is used to estimate the amount of intermediate data produced by the map stage as the input to the reduce stage (note that the size of the input data to the map stage is known).

A "map wave" refers to an iteration of the map stage. If the number of allocated map slots is greater than or equal to the number of map tasks, then the map stage can be completed in a single iteration (single wave). However, if the number of map slots allocated to the map stage is less than the number of map tasks, then the map stage is completed in multiple iterations (multiple waves). Similarly, the number of iterations (waves) of the reduce stage is based on the number of allocated reduce slots as compared to the number of reduce tasks.

The reduce stage includes shuffle, sort and reduce phases. The shuffle phase begins after the first map task is complete. The shuffle phase (of any reduce wave) completes when the entire map stage is complete and all the intermediate data generated by the map tasks has been shuffled to the reduce tasks and has been sorted. The shuffle and sort phases are interleaved. Therefore, the sort phase may be considered to be included in the shuffle phase. After shuffle/sort completes, the reduce phase is performed. Thus the profiles of shuffle and reduce phases may be represented by the average and maximum of their tasks durations. In addition, for the reduce phase, reduce selectivity, denoted as $\text{Selectivity}_R$, is defined as the ratio of the reduce output size to its input.

The shuffle phase of the first reduce wave may be different from the shuffle phase of subsequent reduce waves because the shuffle phase of the first reduce wave may overlap with the map stage and depends on the number of map waves and their durations. Therefore, two sets of measurements may be collected: $(Sh_{avg}^1, Sh_{max}^1)$ for the shuffle phase of the first reduce wave (termed first shuffle) and $(Sh_{avg}^{typ}, Sh_{max}^{typ})$ for the shuffle phase of the subsequent waves (termed typical shuffle). Some implementations seek to identify performance invariants that are independent of the amount of allocated resources to the job, therefore, a shuffle phase of the first reduce wave is uniquely characterized and the parameters $(Sh_{avg}^1$ and $Sh_{max}^1)$ reflect only durations of the non-overlapping portions (non-overlapping with the map stage) of the first shuffle. In other words, the durations represented by $Sh_{avg}^1$ and $Sh_{max}^1$ (represent portions of the duration of the shuffle phase of the first reduce wave that do not overlap with the map stage.

To simplify the shuffle phase computations, the job profiler 112 may use typical shuffle measurements. Thus the shuffle phase of job profile 114 may be characterized as $(Sh_{avg}^{typ}, Sh_{max}^{typ})$. The reduce phase begins only after the shuffle phase is complete. The profile of the reduce phase is represented by the average and maximum of the reduce tasks durations $(R_{avg}, R_{max})$ (where the typical shuffle measurements are included in the duration of the reduce tasks). $\text{Selectivity}_R$, as defined above, is also used. Thus the reduce stage portion of the job profile 114 may be characterized by $(R_{avg}, R_{max}, \text{Selectivity}_R)$.

The estimator 110 estimates the lower and upper bounds on the job completion time using the job profile 114, a given input dataset size, and an amount of resources allocated to the job. Considering a given job J with a given profile 114, the job J is to be executed with a new dataset that is partitioned into $N_M^J$ map tasks and $N_R^J$ reduce tasks. $S_M^J$ and $S_R^J$ represent the number of map slots and reduce slots allocated to job J respectively.

$M_{avg}$ and $M_{max}$ are the average and maximum durations of map tasks (defined by the profile 114 of job J). The estimator 110 estimates the lower and upper bounds on the duration of the entire map stage (denoted as $T_M^{low}$ and $T_M^{up}$ respectively) as:

$$T_{M\text{-}stage}^{low} = N_M^J \cdot M_{avg}/S_M^J \quad (1)$$

$$T_{M\text{-}stage}^{up} = (N_M^J - 1) \cdot M_{avg}/S_M^J + M_{max} \quad (2)$$

The reduce stage includes of shuffle (which includes the interleaved sort phase) and reduce phases. The estimator 110 computes the lower and upper bounds of completion times for reduce phase $(T_R^{low}, T_R^{up})$ based on measurements for average and maximum task durations in the reduce phase, the numbers of reduce tasks $N_R^J$ and allocated reduce slots $S_R^J$:

$$T_{R\text{-}phase}^{low} = N_R^J \cdot R_{avg}/S_R^J \quad (3)$$

$$T_{R\text{-}phase}^{up} = (N_R^J - 1) \cdot R_{avg}/S_R^J + R_{max} \quad (4)$$

There is subtlety in estimating the duration of the shuffle phase. The estimator 110 distinguishes the non-overlapping portion of the first shuffle and the task durations in the typical shuffle. The estimator 110 computes the portion of the typical shuffle phase in the subsequent reduce waves as:

$$T_{Sh-phase}^{low} = \left(\frac{N_R^J}{S_R^J} - 1\right) \cdot Sh_{avg}^{typ} \qquad (5)$$

$$T_{Sh-phase}^{up} = \left(\frac{N_R^J - 1}{S_R^J} - 1\right) \cdot Sh_{avg}^{typ} + Sh_{max}^{typ} \qquad (6)$$

The estimator 110 determines the lower and upper bounds of the entire reduce stage of job J as:

$$T_{R-stage}^{low} = T_{Sh-phase}^{low} + T_{R-phase}^{low} \qquad (7)$$

$$T_{R-stage}^{up} = T_{Sh-stage}^{up} + T_{R-phase}^{up} \qquad (8)$$

Some implementations of the estimator 110 produce an average of the lower and upper bounds as the estimates of the stage execution time (both map and reduce stages) for use by the scheduler 108:

$$T_{M-stage}^{avg} = \frac{T_{M-stage}^{low} + T_{M-stage}^{low}}{2} \qquad (9)$$

$$T_{R-stage}^{avg} = \frac{T_{R-stage}^{low} + T_{R-stage}^{low}}{2} \qquad (10)$$

In some implementations, the scheduler 108 determines the execution order for the jobs of a group of jobs based on map and reduce stage execution time estimates generated by the estimator 110 (e.g., $T_{M-stage}^{avg}$ and $T_{R-stage}^{avg}$). There are no data dependencies among the jobs. Therefore, the scheduler 108 overlaps the jobs, such that when the map phase of a job is complete and the reduce phase of the job begins, map phase execution of the next job starts using the released map resources in a pipelined fashion.

Given a set of n concurrent (i.e., independent) MapReduce jobs J={$J_1, J_2, \ldots, J_n$}. The scheduler 108 seeks to determine an order of execution of jobs $J_i \in J$ (with overlap in execution between one or more jobs) such that the execution time (makespan) of the entire set is minimized. In the ideal case, the makespan $M_J$ of J equals the sum of the execution times of the reduce stages of all jobs $J_i$ and the shortest map stage of a job $J_i$. That is, the lower bound on the makespan is given by:

$$M_J = \min\{m_i\} + \sum_{i=1}^{n} \{r_i\} \qquad (11)$$

Figure 2:
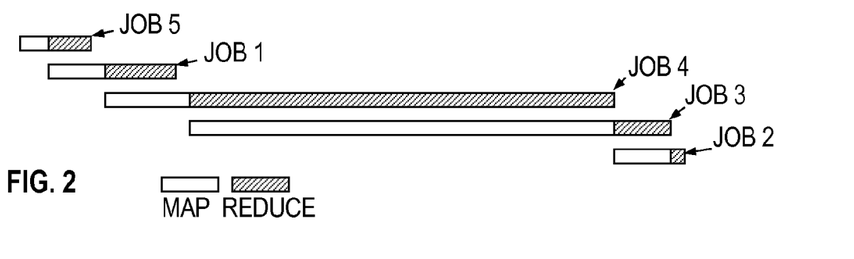
FIG. 2-4 shows job execution schedules based on schedules determined in accordance with principles disclosed herein.

The scheduler 108 can apply various strategies to determine a schedule for the jobs J that tends to minimize the execution time of the jobs. FIG. 2 shows a diagram of execution of the jobs of Table 1 below in accordance the methods 500-600 (FIGS. 5-6) performed by the scheduler 108. The map and reduce stage of the jobs are overlapped to the maximum extent possible to minimize batch execution time.

TABLE 1

| i | $m_i$ | $r_i$ |
|---|---|---|
| 1 | 4 | 5 |
| 2 | 4 | 1 |
| 3 | 30 | 4 |
| 4 | 6 | 30 |
| 5 | 2 | 3 |

Figure 5:
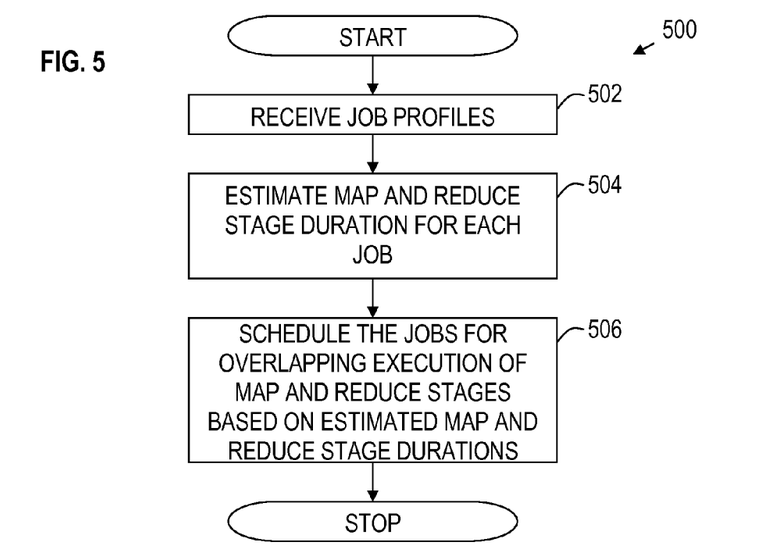
FIG. 5-7 show flow diagrams for methods for scheduling jobs in accordance with principles disclosed herein.

FIG. 5 shows a flow diagram for a method 500 for scheduling jobs in accordance with principles disclosed herein. Though depicted sequentially as a matter of convenience, at least some of the actions shown can be performed in a different order and/or performed in parallel. Additionally, some implementations may perform only some of the actions shown. At least some of the operations of the method 500 can be performed by the processor(s) 104 executing instructions read from a computer-readable medium (e.g., storage 106).

In block 502, the estimator 110 receives job profiles 114 for a set of jobs to be executed using the system 100. Receiving the job profiles 114 can refer to a given node (such as the master node 102) receiving job profiles 114 that are created at another node. Alternatively, receiving the job profiles 114 can involve the job profiler 112 creating the job profiles 114.

In block 504, the estimator 110 determines map stage and reduce stage execution times for each job based on the job profiles 114. For example, the estimator 110 may compute an average map stage and reduce stage execution time for each job as disclosed above and shown in equations (9) and (10). Consider, for example, that five job profiles are provided to the estimator 110, and the estimator 110 computes map phase execution times ($m_i$) and reduce phase execution times ($r_i$) for each job as shown above in Table 1.

In block 506, the scheduler 108 schedules the jobs for execution with the map stage of one job overlapping the reduce stage of another job. The scheduler 108 determines the schedule for the jobs based on the estimated map and reduce stage durations for each job.

Figure 6:
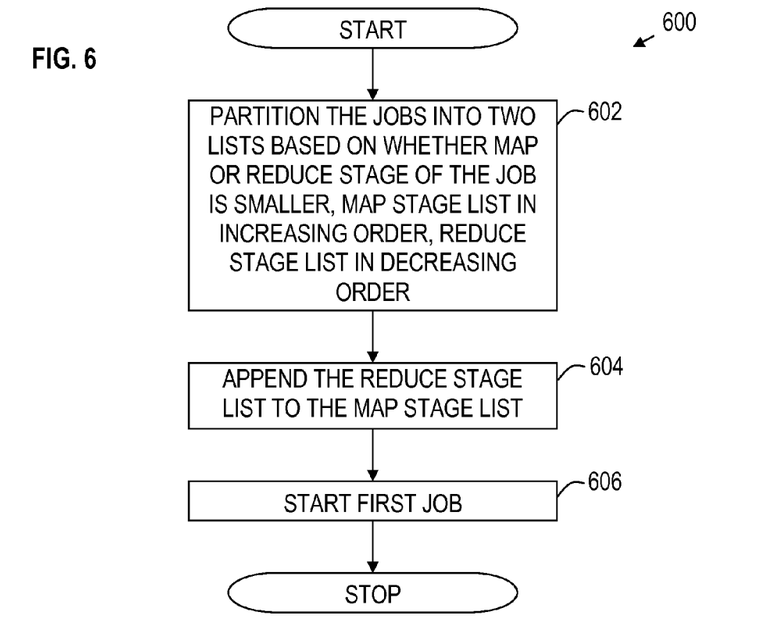

FIG. 6 shows a flow diagram for a method 600 for scheduling jobs in accordance with principles disclosed herein. Though depicted sequentially as a matter of convenience, at least some of the actions shown can be performed in a different order and/or performed in parallel. Additionally, some implementations may perform only some of the actions shown. At least some of the operations of the method 500 can be performed by the processor(s) 104 executing instructions read from a computer-readable medium (e.g., storage 106). The operations of the method 600 may be performed as part of the scheduling of block 506 of the method 500. The operations of the method 600 are described by reference to the jobs of Table 1.

In block 602, the scheduler 108 partitions the five jobs (of Table 1) into two groups: a map stage group and a reduce stage group. For each job, scheduler 108 selects the group to which the job is assigned based on whether the map stage execution time or the reduce stage execution time of the job is smaller. For the five jobs of Table 1, jobs 1, 4, and 5 are assigned to the map stage group, and jobs 2 and 3 are assigned to the reduce stage group. The jobs of the map stage group are sorted by increasing map stage execution time. Thus, the map stage group is ordered as {5, 1, 4}. The jobs of the reduce stage group are sorted by decreasing reduce stage execution time. Thus, the reduce stage group is ordered as {3, 2}.

In block 604, the scheduler 108 appends the reduce stage group to the map stage group to produce a batch execution order of {5, 1, 4, 3, 2} for the five jobs of Table 1.

In block 606, the batch execution order is provided to the master node 102, which begins execution of the first job in the execution order by allocating map tasks of the job to map slots 118 of the worker nodes 116. In accordance with the batch execution order, execution of map tasks of a job may overlap execution of reduce tasks of one or more previous jobs.

Figure 3:
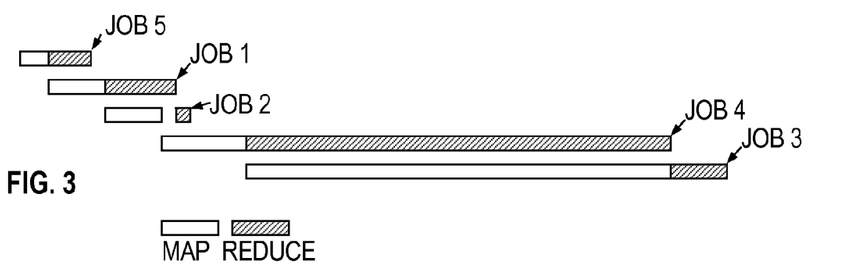
Figure 4:
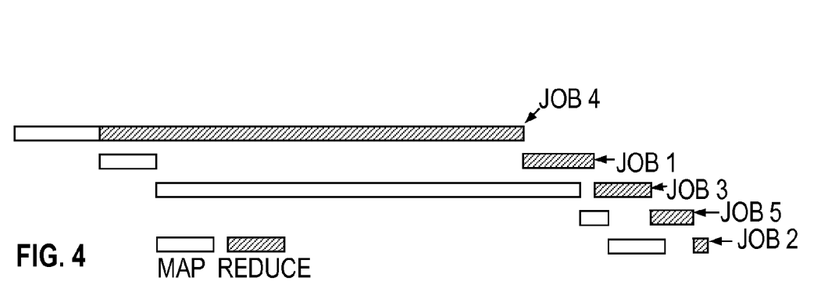

FIGS. 3 and 4 show diagrams of execution of the jobs of Table 1 in accordance with methods 500/700 (FIGS. 5, 7) described herein and performed by the scheduler 108, wherein the scheduler 108 sorts the jobs in accordance with increasing map stage execution time and decreasing reduce stage execution time respectively. The map and reduce stages of the jobs are overlapped, and tend to reduce or minimize batch execution time.

Figure 7:
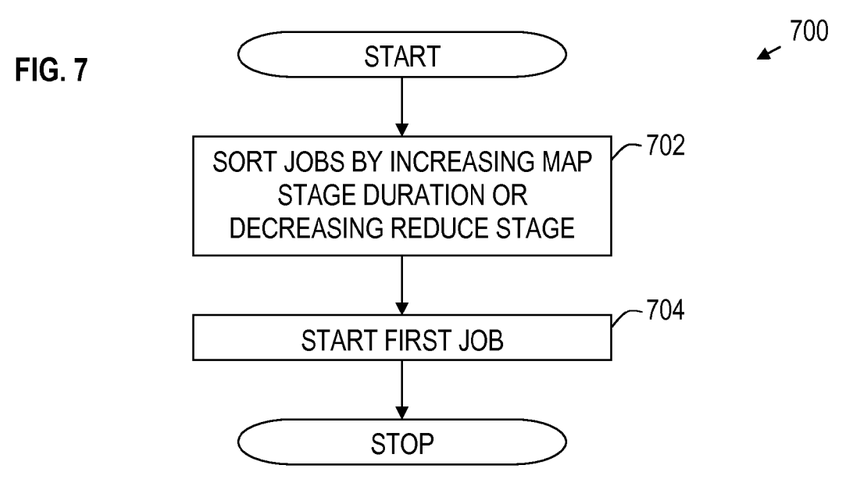

FIG. 7 shows a flow diagram for the method 700 for scheduling jobs in accordance with principles disclosed herein. Though depicted sequentially as a matter of convenience, at least some of the actions shown can be performed in a different order and/or performed in parallel. Additionally, some implementations may perform only some of the actions shown. At least some of the operations of the method 600 can be performed by the processor(s) 104 executing instructions read from a computer-readable medium (e.g., storage 106). The operations of the method 700 may be performed as part of the scheduling of block 506 of the method 500. The operations of the method 700 are described by reference to the jobs of Table 1.

In block 702, the scheduler 108 sorts the five jobs (of Table 1). In one implementation, the scheduler 108 sorts the jobs in accordance with increasing map stage execution time, resulting a batch execution order of {5, 1, 2, 4, 3}. Jobs having the same map stage execution time may be ordered by decreasing reduce stage execution time.

In another implementation, the scheduler 108 sorts the jobs in accordance with decreasing reduce stage execution time, resulting a batch execution order of {4, 1, 3, 5, 2}. Jobs having the same reduce stage execution time may be ordered by increasing map stage execution time.

In block 704, the batch execution order is provided to the master node 102, which begins execution of the first job in the execution order by allocating map tasks of the job to map slots 118 of the worker nodes 116. In accordance with the batch execution order, execution of map tasks of a job may overlap execution of reduce tasks of one or more previous jobs.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   generating, by a processor, a performance model for each of plurality of jobs, wherein each job comprises a plurality of map tasks and a plurality of reduce tasks, wherein the map tasks produce intermediate results based on segments of input data, and the reduce tasks produce outputs based on the intermediate results, the performance model comprising an execution duration for a map stage estimated based on execution of the map tasks by plurality of map slots and an execution duration for a reduce stage estimated based on execution of the reduce tasks by a plurality of reduce slots;
   associating each of the jobs with one of a map stage group and a reduce stage group based on which of the map stage and the reduce stage of the job is of lower execution duration;
   sorting the map stage group by increasing map stage duration value;
   sorting the reduce stage group by decreasing reduce stage duration value; and
   appending the reduce stage group to the map stage group to form an execution order for the jobs.

2. The method of claim 1, wherein the generating comprises determining the execution duration of the map stage based on a number of map slots allocated to process the map tasks, and determining the execution duration of the reduce stage based on a number reduce slots allocated to process the reduce tasks.

3. The method of claim 1, wherein the execution time of jobs is a sum of reduce stage execution duration and a shortest map state execution duration of the map stage.

4. The method of claim 1 wherein the estimating comprises:
   determining, based on a number of map slots allocated to process the map tasks, a number of map waves needed to process the map tasks;
   determining the execution duration for the map stage based on the number of map waves;
   determining, based on a number of reduce slots allocated to process the reduce tasks, a number of reduce waves needed to process the reduce tasks; and
   determining the execution duration for the reduce stage based on the number of reduce waves.

5. The method of claim 1, further comprising executing the jobs in a plurality of worker nodes in a sequence defined by the execution order.

6. The method of claim 5, wherein the reduce stage for each job comprises a shuffle phase and a reduce phase, and further comprising:
   estimating a duration for the shuffle phase of a first reduce wave; and
   estimating a duration for the shuffle phase of all reduce waves subsequent to the first reduce wave;
   wherein the duration for the shuffle phase of the first reduce wave is estimated as only that portion of the shuffle phase that does not overlap the map phase for the job.

7. The method of claim 1, wherein the generating further comprises computing for each job:
   a map stage execution duration upper bound;
   a map stage execution duration lower bound;
   a map stage execution duration average time based on the map stage execution duration upper bound and the map stage execution duration lower bound;
   a reduce stage execution duration upper bound;
   a reduce stage execution duration lower bound; and
   a reduce stage execution duration average time based on the reduce stage execution duration upper bound and the reduce stage execution duration lower bound.

8. A non-transitory computer-readable storage medium encoded with instructions that when executed cause a processor to:
   generate a performance model for each of plurality of jobs, wherein each job comprises a plurality of map tasks and a plurality of reduce tasks, wherein the map tasks produce intermediate results based on segments of input data, and the reduce tasks produce outputs based on the intermediate results, the performance model comprising and execution duration for a map stage estimated based on execution of the map tasks by a plurality of map slots and an execution duration for a reduce stage estimated based on execution of the reduce tasks by a plurality of reduce slots;
   associate each of the jobs with one of a map stage group and a reduce stage group based on which of the map stage and the reduce stage of the job is of lower execution duration;
   sort the map stage group by increasing map stage duration value;
   sort the reduce stage group by decreasing reduce stage duration value; and
   append the reduce stage group to the map stage group to form the execution order for the jobs.

9. The computer-readable storage medium of claim 8, further comprising instructions that when executed cause a processor to:
- determine, based on a number of map slots allocated to process the map tasks, a number of map waves needed to process the map tasks;
- determine the execution duration for the map stage based on the number of map waves;
- determine, based on a number of reduce slots allocated to process the reduce task, a number of reduce waves needed to process the reduce tasks; and
- determine the execution duration for the reduce stage based on the number of reduce waves.

10. The computer-readable storage medium of claim 8, further comprising instructions that when executed cause a processor to:
- determine the execution duration of the map stage based on a number of map slots allocated to process the map tasks, and determine the execution duration of the reduce stage based on a number reduce slots allocated to process the reduce tasks.

11. The computer-readable storage medium of claim 8, further comprising instructions that when executed cause a processor generate:
- a map stage execution duration upper bound;
- a map stage execution duration lower bound;
- a map stage execution duration average time based on the map stage execution duration upper bound and the map stage execution duration lower bound;
- a reduce stage execution duration upper bound;
- a reduce stage execution duration lower bound;
- a reduce stage execution duration average time based on the reduce stage execution duration upper bound and the reduce stage execution duration lower bound.

12. A system, comprising:
at least one processor to:
generate a performance model for each of a plurality of jobs, wherein each job comprises a plurality of map tasks and a plurality of reduce tasks, wherein the map tasks produce intermediate results based on segments of input data, and the reduce tasks produce outputs based on the intermediate results, the performance model comprising an execution duration for a map stage estimated based on execution of the map tasks by a plurality of map slots and an execution duration for a reduce stage estimated based on execution of the reduce tasks by a plurality of reduce slots;
- associate each of the jobs with one of a map stage group and a reduce stage group based on which of the map stage and the reduce stage of the job is of lower execution duration;
- sort the map stage group by increasing map stage duration value;
- sort the reduce stage group by decreasing reduce stage duration value; and
- append the reduce stage group to the map stage group to form the execution order for the jobs.

13. The system of claim 12, wherein the at least one processor is further to determine the execution duration of the map stage based on a number of map slots allocated to process the map tasks, and determine the execution duration of the reduce stage based on a number reduce slots allocated to process the reduce tasks.

14. The system of claim 12, wherein the at least one processor is further to compute:
- a map stage execution duration upper bound;
- a map stage execution duration lower bound;
- a map stage execution duration average time based on the map stage execution duration upper bound and the map stage execution duration lower bound;
- a reduce stage execution duration upper bound;
- a reduce stage execution duration lower bound; and
- a reduce stage execution duration average time based on the reduce stage execution duration upper bound and the reduce stage execution duration lower bound.

* * * * *